US007558768B2

(12) United States Patent
Parida (10) Patent No.: US 7,558,768 B2
(45) Date of Patent: Jul. 7, 2009

(54) TOPOLOGICAL MOTIFS DISCOVERY USING A COMPACT NOTATION

(75) Inventor: Laxmi Parida, Mohegan Lake, NY (US)

(73) Assignee: International Business Machines Corporation, Armonk, NY (US)

(*) Notice: Subject to any disclaimer, the term of this patent is extended or adjusted under 35 U.S.C. 154(b) by 307 days.

(21) Appl. No.: 11/174,833

(22) Filed: Jul. 5, 2005

(65) Prior Publication Data

US 2007/0027662 A1 Feb. 1, 2007

(51) Int. Cl.
*G06N 5/00* (2006.01)
(52) U.S. Cl. .............................. 706/45; 706/12; 706/48
(58) Field of Classification Search ...................... 706/8, 706/17, 18, 45–48, 12
See application file for complete search history.

(56) References Cited

U.S. PATENT DOCUMENTS

| 5,787,279 | A  | * | 7/1998  | Rigoutsos ........................ 707/6 |
| 6,931,326 | B1 | * | 8/2005  | Judson et al. .................. 702/20 |
| 2004/0077090 | A1 | * | 4/2004  | Short ............................ 435/471 |
| 2004/0204925 | A1 | * | 10/2004 | Alon et al. ....................... 703/2 |
| 2005/0170528 | A1 | * | 8/2005  | West et al. .................... 436/518 |
| 2005/0191731 | A1 | * | 9/2005  | Judson et al. ................ 435/104 |
| 2007/0055662 | A1 | * | 3/2007  | Edelman et al. ................. 707/6 |

OTHER PUBLICATIONS

Wang et al. "Finding Patterns in Three-Dimensional Graphs: Algorithms and Applications to Scientific Data Mining", 2002, pp. 731-749.*
Parida et al. "Pattern Discovery on Character Sets and Real-Vlued Data: Linear Bound on Irredundant Motifs and an Efficient Polynomial Time Alcorithm", 2000, pp. 1-12.*
Wang et al. "Finding Patterns in Three-Dimensional Graphs: Algorithms and Applications to Scientific Data Mining", 2002, p. 731-749.*
Parida et al, "Pattern Discovery on Character Sets and Real-Vlued Data: Linear Bound on Irredundant Motifs and an Efficient PolynomialTime Alcorithm", 2000, pp. 1-12.*
Apostolico et al. "Incremental Paradigms of Motif Discovery", 2004, pp. 15-25.*

* cited by examiner

*Primary Examiner*—David R Vincent
*Assistant Examiner*—Omar F Fernandez Rivas
(74) *Attorney, Agent, or Firm*—Scully, Scott, Murphy & Presser, P.C.; Vazken Alexanian (57) ABSTRACT

Discloses are a method of and a system for identifying a motif in a graph. The graph has multiple vertices, and the vertices have one or more attributes. The method comprises the steps of, for each of the vertices that have at least a defined one attribute, identifying a set of vertices, if any, adjacent to said each vertex and having at least one specified attribute; and forming a first list comprised of said identified sets. The method comprises the further steps of determining the unique intersections of the sets of said first list; computing compact forms of the sets on said first list; and identifying a motif of the graph from said unique intersections.

26 Claims, 5 Drawing Sheets

```
PREPROCESS()
    For each attribute a_k
        For each vertex v_i with attribute a_j
            L_j^k ={v_i||V[i][j]|>0}
    For each attribute a_k
        COMMONALITY({L_1^k,L_2^k...},V,D,k)
```

```
COMMONALITY (L,V,h,k)
{
    (1) If (h≤0) Then Exit
    (2) Let L'={v_i||V[i][h]|>0}
    (3) If ((|L'|≥k) and not EXIST(L'))
        (4) CREATE-SET(L')
        (5) COMMONALITY(L',V,h-1,k)
    (6) COMMONALITY(L,V,h-1,k)
}
```

FIG. 5

```
XTION (L,h,k)
{
    (1) If (h≤0) Then Exit
    (2) Let L'={v_i ∈ Flat(L),L∈L}
        (3) If ((|L'|≥k) and not EXIST(L'))
            (4) CREATE-SET(L')
            (5) XTION(L',h-1,k)
        (6) XTION(L,h-1,k)
}
```

String sBFS (idno,TransEdges,level,N,n[1..N],at[1..N],L[1..N][ ],F[1..N][ ])
// Attributes are $a_{at[j]}$, j=1...N (not necessarily distinct)
// L[j][i] denotes the ith element with attribute $a_{at[j]}$
// F[j][i] is the forbidden set for L[j][i]
// Compact location list $\mathcal{L}$ with attribute $a_{at[j]}$ is {L[j][1],L[j][2],...,L[j][n[j]]}
{
   (1) If N=0 return("")
   (2) For j=1...N
      Store compact list {L[j][1],...L[j][n[j]]} in database $\mathcal{D}$ with idno
      //Mark the location lsit as symmetric or non-symmetric vertices
      If $\max_i L_i = 1$ mark as NONSYM else mark SYM
   (3) For j=1...N, s[j] ← "$\min_i$|L[j][i]|"+ "at[j]"
   (4) new N ← 0
   (5) For j=1...N
    (6) For each attribute $a_{j'}$
      (7) For i=1...n[j]
        For each k
          $V_{ik}^{jj'}$ = neighbors of $v_k \in$ L[j][i] with attribute $a_{j'}$
          $V_{ik}^{jj'} \leftarrow V_{ik}^{jj'}$ -F[j][i]                    // remove forbidden element(s)
          Let $C_i^j = \{v \in V_{ik}^{jj'} | v \in L[j''][i''] $ for some $k,j',j'',i''\}$    // cross list?
          $V_{ik}^{jj'} \leftarrow V_{ik}^{jj'} - C_i^j$                    // remove cross edges from the BFS
      (8) If $V_{ik}^{jj'} \neq \phi$ for all k AND
          (($V_{ik}^{jj'} \notin \mathcal{D}$) OR ($V_{ik}^{jj'} \in \mathcal{D}$ AND marked SYM)) Then
          newat[++newN] ← j',cnt ← 0
          For each i and k,newL[newN][++cnt] ← $V_{ik}^{jj'}$,newF[newN][cnt] ← {$v_i$}
          newn[newN] ← cnt
   // Cross edges going across levels
   (9) If newL[$k_1$][ ]=newL[$k_2$][ ]...=newL[$k_n$][ ] for some $k_1 \neq k_2 ... \neq k_n$
      then s[$j_1$] ← "[" +s[$j_1$]+","+...s[$j_n$]+"]"
      and s[$j_2$],...,s[$j_n$] and newL[$k_2$][ ],newL[$k_3$][ ],...,newL[$k_n$][ ]
      with the corresponding elements in newF,newat deleted and newN updated
   // Cross edges within the same level
   (10) If L[j'][i]$\subseteq C_i^j$ for some j' and all i
      then TransEdges ← TransEdges $\cup \{a_j^{level}, a_{at[j]}^{level}\}$    (11) news ← sBFS (idno,TransEdges,level+1,newN,newn,newat,newL,newF)
   (12) for j=1...N,tmp ← s[j]+"("+news[j]+")" +","  // remove last ","
   (13) return (tmp)
{

TOPOLOGICAL MOTIFS DISCOVERY USING A COMPACT NOTATION

BACKGROUND OF THE INVENTION

1. Field of the Invention

This invention generally relates to methods and systems for analyzing graphs. More specifically, the invention relates to methods and systems for finding frequently occurring subgraphs, or motifs, in one or more graphs.

2. Background Art

Understanding large volumes of data is a key problem in a large number areas such as the World Wide Web, bioinformatics and so on. Some of data in these areas cannot be represented as linear strings which have been studied extensively with a repertoire of sophisticated and efficient algorithms. The inherent structure in the data is best represented as graphs. This is particularly important in areas such as bioinformatics or chemistry since it might lead to understanding of biological systems from indirect evidences in the data. Thus automated discovery of "phenomenon" is a promising path to take as is evidenced by the use of motif (substring) discovery in DNA and protein sequences.

A protein network is a graph that encodes primarily protein-protein interactions and this is important in understanding the computations that happen with a cell. A recurring topology or motif in such a setting has been interpreted to act as robust filters in the transcriptional network of *Escherichia coli*. It has been observed that the conservation of proteins in distinct topological motifs correlates with the interconnectedness and function of that motif and also depends on the structure of the topology of all the interactions indicating that motifs may represent evolutionary conserved topological units of cellular networks in accordance with specific biological functions they perform. This observation is strikingly similar to the hypothesis in dealing with DNA and protein primary structures.

Topological motifs are also being studied in the context of structural units in RNA and for structural multiple alignments of proteins. For yet another application consider a typical chemical dataset: a chemical is modeled as a graph with attributes on the vertices and the edges. A vertex represents an atom and the attribute encodes the atom type; an edge models the bond between the atoms it connects and its attribute encodes the bond type. In such a database, very frequent common topologies could suggest the relationship to the characteristic of the database. For instance, in a toxicology related database, the common topologies may indicate carcinogenicity or any other toxicity.

In the field of machine learning, methods have been proposed to search for subgraph patterns which are considered characteristic and appear frequently: this uses an apriori-based algorithm with generalizations from association discovery. In massive data mining where the data is extremely large of the order of tens of gigabytes. These include the world wide web, internet traffic and telephone call detail. These are used to discover social networks and web communities among other characteristics.

In biological data the size of the database is not as large, yet unsuitable for enumeration schemes. When this scheme was applied researchers had to restrict their motifs to small sizes such as three or four.

SUMMARY OF THE INVENTION

An object of this invention is to find frequently occurring subgraphs in one or more graphs.

Another object of the invention is to find frequently occurring and maximal subgraphs in one or more graphs.

A further object of the present invention is to analyze graphical data using a combinatorial approach and a compact notation, to identify frequently occurring and maximal subgraphs in one or more graphs.

These and other objectives are attained with a method of and a system for identifying a motif in a graph. The graph has multiple vertices, and the vertices have one or more attributes. The method comprises the steps of, for each of the vertices that have at least a defined one attribute, identifying a set of vertices, if any, adjacent to said each vertex and having at least one specified attribute; and forming a first list comprised of said identified sets. The method comprises the further steps of determining the unique intersections of the sets of said first list; computing compact forms of the sets on said first list; and identifying a motif of the graph from said unique intersections.

The preferred embodiment of the invention, described in detail below, takes a combinatorial approach to the problem and introduces a compact notation to handle the combinatorial explosion arising from isomorphisms. The problem is abstracted as follows: Given a graph $G(V,E)$ with labeled vertices and edges, the task is to discover at least $k(>1)$ subgraphs that are topologically identical in G. Such subgraphs are termed topological motifs. It is very closely related to the classical subgraph isomorphism problem defined as follows:

Problem 1 (subgraph isomorphism) Given graphs $G=(V_1, E_1)$ and $H=(V_2,E_2)$. Does G contain a subgraph isomorphism to H, i.e., a subset $V \subseteq V_1$ and a subset $E \subseteq E_1$ such that $|V|=|V_2|$, $|E|=|E_2|$ and there exists a one-to-one function $f: V_2 \to V$ satisfying $\{v_1, v_2\} \in E_2$ if and only if $\{f(v_1), f(v_2)\} \in E$?

Two closely related problems are as follows:

Problem 2 (largest common subgraph) Given graphs $G=(V_1,E_1)$ and $H=(V_2,E_2)$, positive integer K. Do there exist subsets $E'_1 \subseteq E_1$ and $E'_2 \subseteq E_2$ with $|E'_1|=|E'_2| \geq K$ such that the two subgraphs $G'=(V_1, E'_1)$ and $H'=(V_2, E'_2)$ are isomorphic?

Problem 3 (maximum subgraph matching) Given directed graphs $G=(V_1,E_1)$ and $H=(V_2,E_2)$, positive integer K. Is there a subset $R \subseteq V_1 \times V_2$ with $|R| \geq K$ such that for all $<u, u'>, <v, v'> \in R$, $(u,v) \in A_1$ if and only if $(u', v') \in A_2$?

All the three problems are NP-Complete: each can be transformed from the CLIQUE problem.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 8 shows the pseudo code of a third routine of the algorithm that is used in the preferred embodiment of the invention.

DETAILED DESCRIPTION OF THE PREFERRED EMBODIMENTS

The present invention, generally, provides a method and system for identifying topological motifs in a graph. The graph has multiple vertices, and the vertices have one or more attributes. The method comprises the steps of, for each of the vertices that have at least a defined one attribute, identifying a set of vertices, if any, adjacent to said each vertex and having at least one specified attribute; and forming a first list comprised of said identified sets. The method comprises the further steps of determining the unique intersections of the sets of said first list; computing compact forms of the sets on said first list; and identifying a motif of the graph from said unique intersections.

The preferred embodiment of the invention takes a combinatorial approach to the problem and introduces a compact notation to handle the combinatorial explosion arising from isomorphisms. The problem is abstracted as follows: Given a graph G(V,E) with labeled vertices and edges, the task is to discover at least k(>1) subgraphs that are topologically identical in G. Such subgraphs are termed topological motifs. It is very closely related to the classical subgraph isomorphism problem defined as follows:

Problem 1 (subgraph isomorphism) Given graphs $G=(V_1, E_1)$ and $H=(V_2,E_2)$. Does G contain a subgraph isomorphism to H, i.e., a subset $V \subseteq V_1$ and a subset $E \subseteq E_1$ such that $|V|=|V_2|$, $|E|=|E_2|$ and there exists a one-to-one function $f: V_2 \to V$ satisfying $\{v_1, v_2\} \in E_2$ if and only if $\{f(v_1), f(v_2)\} \in E$?

Two closely related problems are as follows:

Problem 2 (largest common subgraph) Given graphs $G=(V_1,E_1)$ and $H=(V_2,E_2)$, positive integer K. Do there exist subsets $E'_1 \subseteq E_1$ and $E'_2 \subseteq E_2$ with $|E'_1|=|E'_2| \geq K$ such that the two subgraphs $G'=(V_1, E'_1)$ and $H'=(V_2, E'_2)$ are isomorphic?

Problem 3 (maximum subgraph matching) Given directed graphs $G=(V_1,E_1)$ and $H=(V_2,E_2)$, positive integer K. Is there a subset $R \subseteq V_1 \times V_2$ with $|R| \geq K$ such that for all $<u, u'>$, $<v,v'> \in$ R, $(u, v) \in A$, if and only if$(u', v') \in A_2$?

All the three problems are NP-Complete: each can be transformed from the CLIQUE problem.

Figure 1:
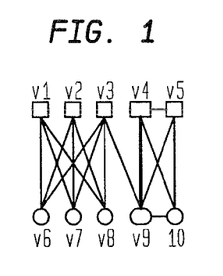
FIG. 1 shows an input graph with nodes numbered from v1 to v10.
Figure 2:
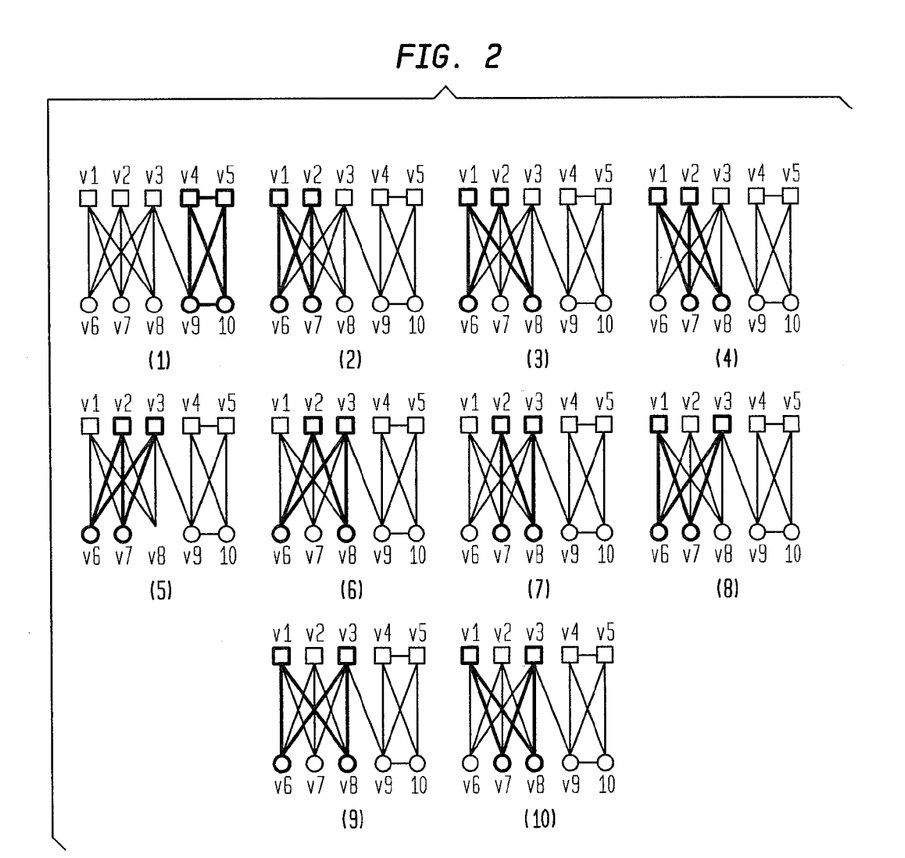
FIG. 2 shows ten occurrences of a topological motif in the graph of FIG. 1.

The present invention is directed toward finding at least k isomorphs and all possible subh isomorphs. This principal is generally illustrated in FIGS. 1 and 2. FIG. 1 shows an input graph G with nodes numbered from v1 to v10. The nodes represented by squares have the attribute s, and the circular nodes have attribute r. FIG. 2 shows in bold the ten occurrences of a topological motif of the graph shown in FIG. 1.

A naive enumeration to discover all the topological motifs is stymied primarily by the combinatorial explosion. When a common topology represented by G' occurs at least k times in a graph, so do all the subgraphs of G'. Also, when a vertex v has n identical neighbors and only k need to be chosen then there are $\binom{n}{k}$ways of choosing v's neighbors leading to a combinatorial explosion: this is a result of self-isomorphism in the subgraphs.

A discovery process must handle these issues appropriately to make the task of topological motif detection a practical and an useful process. At the same time it is vital that there is no loss of information. This requires some natural restrictions like maximality. Also, the preferred embodiment of the invention uses a compact notation to handle the self-isomorphism related issues.

The problem that is addressed by this invention can generally be described as follows. Consider a directed a graph G(V, E) with $|V|=n$. Let $A_V$ be a finite set of elements and a mapping from each vertex to an element in $A_V$ is defined by $A(v \in V)=a_v \in A_V$, for each $v \in V$. Also, Let $A_E$ be a finite set of elements and a mapping from each directed edge $e=v_i v_j$ to an element in $A_E$ is defined by $A(e \in E)=a_e \in A_E$, for each $e \in E$.

A topological motif is a graph $M(V_m, E_m)$ with $V_m=\{v_0, v_1, v_2, \ldots, v_p\}$ and is said to occur on the set of vertices $S_i=\{v_{i0}, v_{i1}, v_{i2}, \ldots, v_{ip}\} \subseteq V$ of graph G, if and only if 1. there is a one-to-one mapping from the vertices in M to the vertices in $S_i$ given as $F(v_j \in V_m)=v_{ij}$ $v_{ij} \in V$ with $A(v_j)=A(F(v_j))$, and,
2. if there is a directed edge $v_{j1}v_{j2} \in E_m$ then 
$F(v_{j1})F(v_{j2}) \in E$ holds, and,
$A(v_{j1}v_{j2})=A(F(v_{j1})F(v_{j2}))$
$F()$ is invertible and its inverse is given by $F^{-1}()$.

Let the motif M occur at $S_1=\{v_{1j}|0 \leq j \leq p\}$ and $S_2=\{v_{2j}|0 \leq j \leq p\}$ with the numbering scheme defined by the j's. $S_1$ and $S_2$ are aligned if $F^{-1}(v_{1j})=F^{-1}(v_{2j})$, for $0 \leq j \leq p$.

Let $S_1, S_2, \ldots S_k \subseteq V$ be such that topological motif M occurs on each of $S_{i1}$, $1 \leq i \leq k$ such that for each pair $1 \leq j_1$, $j_2 \leq k$, $S_{j1}$ and $S_{j2}$ are aligned and there is no S distinct from each of $S_i$ such that motif M occurs on S. In other words this list is complete.

Then the set $L_M^j=\{v_{ij}|1 \leq i \leq k, 0 \leq j \leq p\}$ is the j-location list of M. $L_M^0$ is also denoted by $L_M$ and also called the location list of M.

Maximality. We next define a maximal motif.

Definition 1 (maximal, in position, in size) A topological-motif is maximal if both the following conditions, i.e., maximal in position and size, hold:

1. Maximal in position
There exists no edge $e=v_{j1}v_{j2} \notin E_m$, $v_{j1}$, $v_{j2} \in V_m$ such that $A(F(v_{j1})F(v_{j2}))=a_c$ for some $a_c \in A_E$.
2. Maximal in size
There exists no $v_{ji}, v_{j2}, \ldots, v_{jp} \in V, v_j \in V_m$ with $v_{ji} \notin S_i$ and there is an edge between the vertices $v_{ji}$ and $v'_{ji} \in S_i$ holding the following conditions.
(a) $A(v_{ji})=a_c$ for some $a_c \in A_V$ for $1 \leq i \leq k$,
(b) $F^{-1}(v'_{ji})=v_c$ for some $v_c \in V_m$ for $1 \leq i \leq k$
(c) $A(v_{ji}v'_{ji})=a_c$ for some $a_c \in A_E$ for $1 \leq i \leq k$, or,
$A(v'_{ji}v_{ji})=a_c$ for some $a_c \in A_E$ for $1 \leq i \leq k$.

Figure 3:
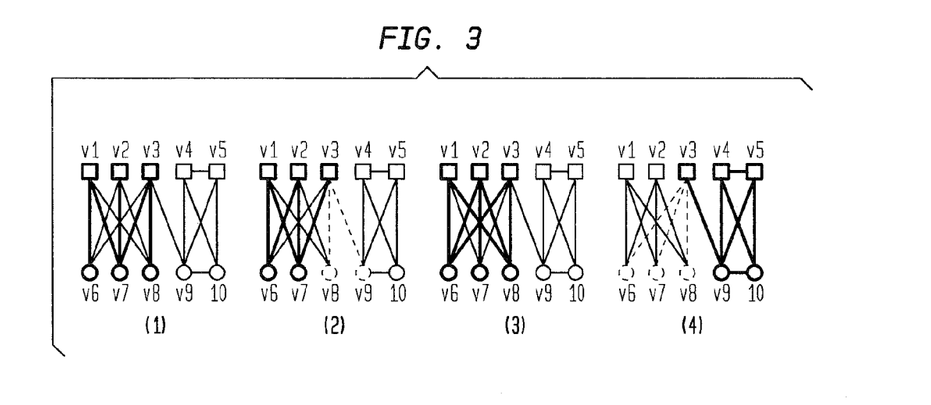
FIG. 3 shows the occurrences of a maximal topological motif in the graph of FIG. 1.

This is illustrated in FIG. 3. More specifically, FIG. 3 shows in bold the occurrences of a maximal topological motif of the graph shown in FIG. 1.

Compact location list. To ease handling combinatorial explosion, we introduce the compact location list. A compact location list represents several location lists as one list using the compact notation described below. A compact list shown as $$\mathcal{L}=\{\{v_1, v_2, v_3\}, \{v_4, v_5\}\}$$

denotes three lists as follows: (1) $\mathcal{L}_1=\{\{v_1, v_2\}, \{v_4, v_5\}\}$, (2) $\mathcal{L}_2=\{\{v_1, v_3\}, \{v_4, v_5\}\}$ and (3) $\mathcal{L}_3=\{\{v_2, v_3\}, \{v_4, v_5\}\}$ Thus a compact list is a list of lists, $L_i$. Let $l_d=\min_i|L_i|$ and $l_m=\max_i|L_i|$. A set $L_i$ with $|L_i|=l_d$ is called a discriminant of L. Thus each non-discriminant $L_i$ of L can be viewed as a list of any $l_d$ out of $|L_i|$ elements and written as $\binom{|Li|}{l_d}L_i$.

Thus a compact location list can also be viewed as a set of elements e as follows: $\mathcal{L}_M^{j|id}=\{e=\binom{m}{l_d}L|$ and $l_d$ of the $m=|L|$ elements of $v_i \in L\}$ $j_1$-$j_{l_d}$ denote the $l_d$ location lists corresponding to vertices numbered from $j_1$ to $j_{l_d}$ in the topological motif and are represented simultaneously in the location list.

We next define the set operations on the compact location lists.

Definition 2 (set operations) Given two compact location lists $\mathcal{L}_1$ and $\mathcal{L}_2$, let $\mathcal{L}_1$ and $\mathcal{L}_2$ denote the family of the location lists.

1. $\mathcal{L}_1 = \mathcal{L}_2$ holds if the two families $\mathcal{L}_1$ and $\mathcal{L}_2$ are identical.
2. $\mathcal{L}_1 \subset \mathcal{L}_2$ holds if for each set $\mathcal{L}_{1i} \in \mathcal{L}_1$ and each j in $\mathcal{L}_{2j} \in \mathcal{L}^e$, $\mathcal{L}_{1i} \subset \mathcal{L}_{2j}$ holds.
3. $\mathcal{L}_3 = \mathcal{L}_1 \cap \mathcal{L}_2$, if for each i and j, $\mathcal{L}_{1i} \cap \mathcal{L}_{2j} \in \mathcal{L}_3$.
4. $\mathcal{L}_3 = \mathcal{L}_1 \cup \mathcal{L}2$, if for each i and j, $\mathcal{L}_{1i} \cup \mathcal{L}_{2j} \in \mathcal{L}_3$.

Undirected Graph with (Only) Vertex Attributes

The discussion below deals with undirected graphs with only vertex attributes. We show that any graph can be mapped onto such a graph and the results from this can be mapped back to the original graph. The mapping of a general graph to an undirected graph with only vertex attributes is straightforward and this is demonstrated in the attached Appendix.

Algorithm

The algorithm proceeds in three major steps as described below.

Step 1-Computing the Commonalities

Figure 4:
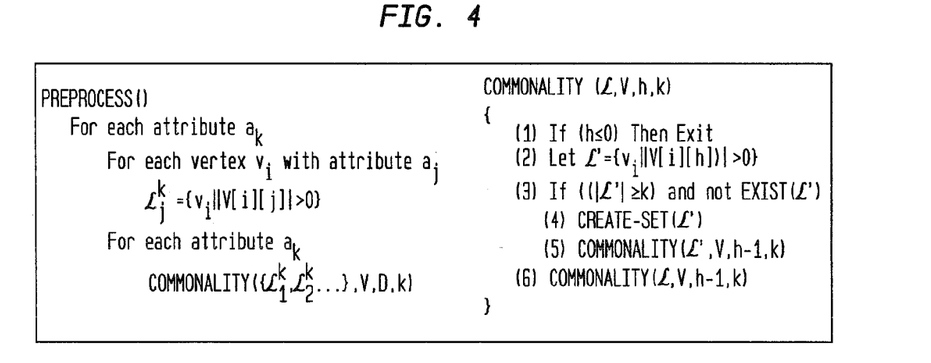
FIG. 4 illustrates a first routine of an algorithm used in the preferred embodiment of this invention.

Assume a vector A of dimension D where D is the number of distinct attributes associated with each vertex $v_i$ in each of $L_i$. Let V[i][j] be the set of vertices adjacent to $v_i$ having the attribute $a_j$. Construct a binary tree T using the recursive subroutine shown in FIG. 4. Assume a function CREATE-SET(L) which creates $\mathcal{L}$, a subset of $\mathcal{L}_1, \mathcal{L}_2, \ldots, \mathcal{L}_n$ in an appropriate data structure D (say a tree). A query of the form if a subset $\mathcal{L} \in D$ (EXIST($\mathcal{L}$)) returns a True/False in time O(log n). Let D be the number of distinct attributes and k be the quorum.

The PREPROCESS routine takes time O(|E|) since each edge is read at most twice during the process. Next in the routine COMMONALITY, all the unique intersection sets, which are N in number are at the leaf node of tree T. Also, the number of internal nodes cannot exceed the number of leaf nodes, N. Thus the total number of nodes of T is O(N). The cost of query at each node is O(log n) (line (3) of COMMONALITY). The size of the input data is O(nm) and each data item is read exactly once in the algorithm (line (2) of COMMONALITY) Hence the algorithm takes O(N log n+nm) time.

Let the L sets constructed by COMMONALITY be $\mathcal{L}_l^k = \{\mathcal{L}_{j_1}^k, \mathcal{L}_{j_2}^k, \ldots, \mathcal{L}_{j_n}^k\}$ where l=1, 2, ... L. Then for each set construct the following corresponding sets:

1. $\mathcal{L}_0^{kj} = \{(v_i | v_i \in \mathcal{L}_j^k, j=j_1, j_2, \ldots, j_m\}$. Each vertex in $\mathcal{L}_0^{kj}$ has the attribute $a_k$.
2. For each k, and for each j and for each $L_l^k$ construct $L_l^{kj} = \{V[i][j] v_i \in \mathcal{L}_l^k\}$. Each vertex in $L_l^{kj}$ has the attribute $a_j$. For each l, $\mathcal{L}_l^{kj}$ is two-way linked with $\mathcal{L}_0^{kj}$. There is a one-to-one correspondence between the elements of the sets which is also maintained.

To summarize, for each attribute $a_j$, two kinds of location lists have been created as discussed above. For simplicity, we collect all the sets having the attribute and let the number of these sets of vertices with attribute $a_j$ be J denoted as $\mathcal{L}_1^j, \mathcal{L}_2^j, \ldots, \mathcal{L}_j^j$.

Step 2-Computing the Unique Intersections

Next, for each attribute $a_j$, we compute all the unique intersection of the sets $\mathcal{L}_1^j, \mathcal{L}_2^j, \ldots, \mathcal{L}_j^j$. Note that these sets are compact.

Let the flat set be simply the collection of all the vertices in the compact list. Thus if $\mathcal{L}_1 = \{\{v_1, v_2, v_3\}, \{v_3, v_4\}\}$ then the corresponding flat list is $F_1 = \{v_1, v_2, v_3, v_4\}$. However for $\mathcal{L}_2 \neq \mathcal{L}_1$ and $\mathcal{L}_2 = \{\{v_1, v_2\}, \{v_3, v_4\}\}$, the flat lists could be the same i.e., $F_1 = F_2$.

Figure 5:
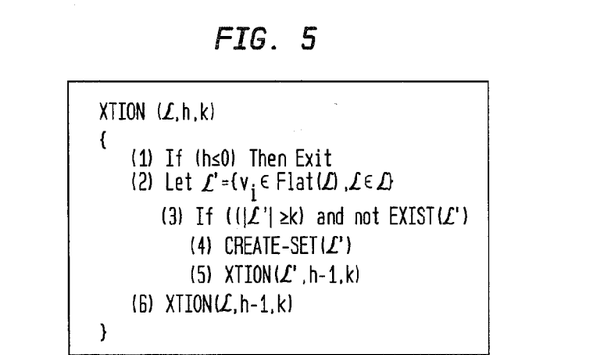
FIG. 5 shows a second routine of the algorithm used in the preferred embodiment of the invention.

The recursive routine to compute the unique intersection of $\mathcal{L}_1^j, \mathcal{L}_2^j, \ldots, \mathcal{L}_j^j$ for each j is shown in FIG. 5. Let Flat($\mathcal{L}$) denote the flat set of $\mathcal{L}$. This routine is along the lines of the routine COMMONALITY.

Recall the set intersection of compact sets from Definition 2. We use the following operational definition (which is equivalent): Let $\mathcal{L} = \mathcal{L}_1 \cap \mathcal{L}_2 \cap \ldots \mathcal{L}_K$ then $v_i, v_j \in \mathcal{L} \in \mathcal{L}$ if and only if $v_i, v_j \in \mathcal{L} \in \mathcal{L}_k$ for each k=1, 2, ... K Thus the intersection algorithm proceeds in two stages. In stage 1 all the unique intersection of the flat sets are computed using the "XTION" algorithm and in the second stage the compact forms of the sets are computed as shown above.

Next as each location list loses elements due to the intersection, the list it is linked to (with a different attribute) also loses the same corresponding elements to create new location lists.

Step 2 is iterated until no more new location lists are formed.

4.3 Step 3-Maximal Motif from the Compact Location List

The third part of the algorithm is based on the theorem that given a set of vertices $v_1, v_2, \ldots, v_k$ with the same attribute in a graph G, there exists a unique topological motif m such that $F^{-1}(v_i) = v_m$ for some vertex $v_m$ in the motif m for $1 \leq i \leq k$ and is maximal in size.

A corollary of this theorem is that if $v_1, v_2, \ldots, v_k$ is complete, then m is a maximal topological motif.

There can be various other ways of computing the maximal motifs from the list of all the location lists. Below we present a compact-conglomerate representation of the motif using a simultaneous BFS (sBFS) as described below. $\mathcal{L}_1^j, \mathcal{L}_2^j, \ldots, \mathcal{L}_j^j$.

Compact-Conglomerate Notation

Figure 6:
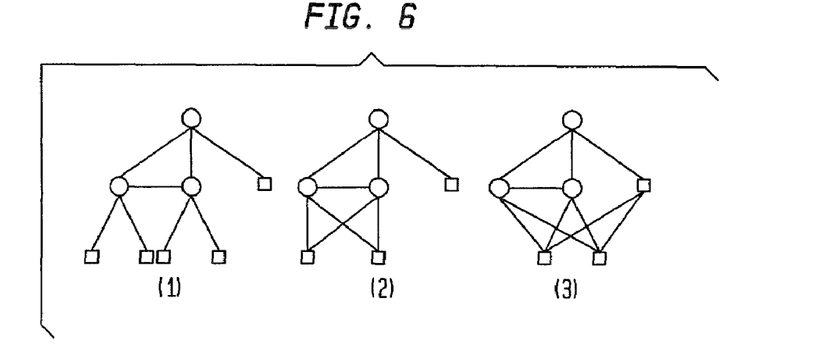
FIG. 6 shows several examples of a notation that may be used in the present invention.
Figure 7:
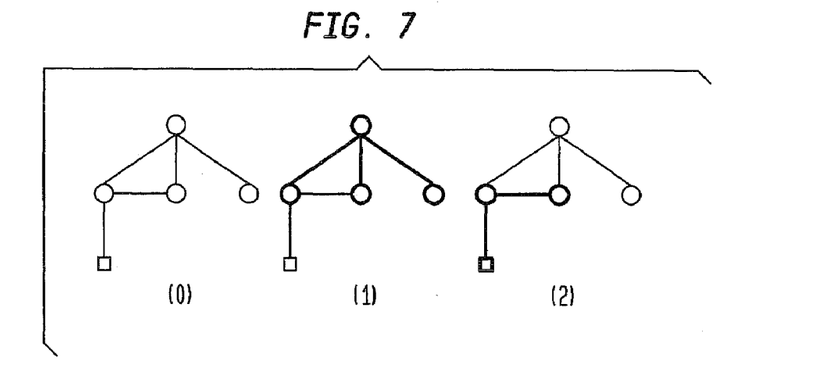
FIG. 7 illustrates a conglomerate notation that may also be used in the practice of this invention.

In this notation, neighbors of a vertex with identical attributes are treated as indistinguishable in the sBFS routine. If they are distinguishable, they will be explored in a BFS originating in a different root and will be placed together in a conglomerate representation, that will describe vertices that are the same in the two representation. FIG. 6 illustrates the indistinguishable neighbors format and FIG. 7 illustrates the conglomerate notation.

Simultaneous BFS

The simultaneous BFS is a recursive routine that breadth first traverses all the locations simultaneously to obtain the maximal topological motif. The outline of the pseudocode is shown in FIG. 8. The maximal motif is given by the spanning tree of the BFS augmented with the cross edges that span two levels and the cross edges that are within the same level. The latter set is given as a set and the former has a notation as follows: each vertex is denoted by its attribute, it's level in the BFS traversal is the superscript and the prefix number represents the number of nodes in that level with the same attribute. FIG. 6 shows some examples and the use of square and round brackets in the notation.

For the sake of clarity, some details in the algorithm have been omitted but will be clear from the context. Also, the intent of the pseudocode shown in FIG. 8 is to give a clear algorithm and this pseudocode may not be optimal. The maintenance of a database D, used in the sBFS routine is used to avoid duplicate computations. Also, this helps in eliminating the repeated discovery of self-isomorphic motifs.

The algorithm computes the topological motifs where the neighboring vertices with identical attributes are treated to be identical (in the compact notation). Otherwise, two distinct location lists $\mathcal{L}_1$ and $\mathcal{L}_2$ such that Flat($\mathcal{L}_1$)=Flat($\mathcal{L}_2$) need to be merged. This can be done from the database D.

To summarize, the algorithm works as follows:
1. For each attribute $a_j$ obtain the $\mathcal{L}_1^j, \mathcal{L}_2^j, \ldots, \mathcal{L}_j^j$. Compute all the unique intersections of these sets and save them in a database D. These correspond to the location list of a maximal topological motif.
2. For each unmarked element from D, compute the topological motif M and mark each location list in the database with M (denoted as $\mathcal{L}_M$). Repeat the process until all the elements are marked in D. Note that an element may be multiply marked.
3. The maximal topological motif is represented by the conglomerate of $M_i$, where Flat($\mathcal{L}_{M_{i1}}$)=Flat($\mathcal{L}_{M_{i2}}$) where $i_1 \neq i_2$.

The present invention can be realized in hardware, software, or a combination of hardware and software. Any kind of computer/server system(s)—or other apparatus adapted for carrying out the methods described herein—is suitable. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art and it is intended that the appended claims cover all such modifications and embodiments as fall within the true spirit and scope of the present invention.

APPENDIX

Figure 9:
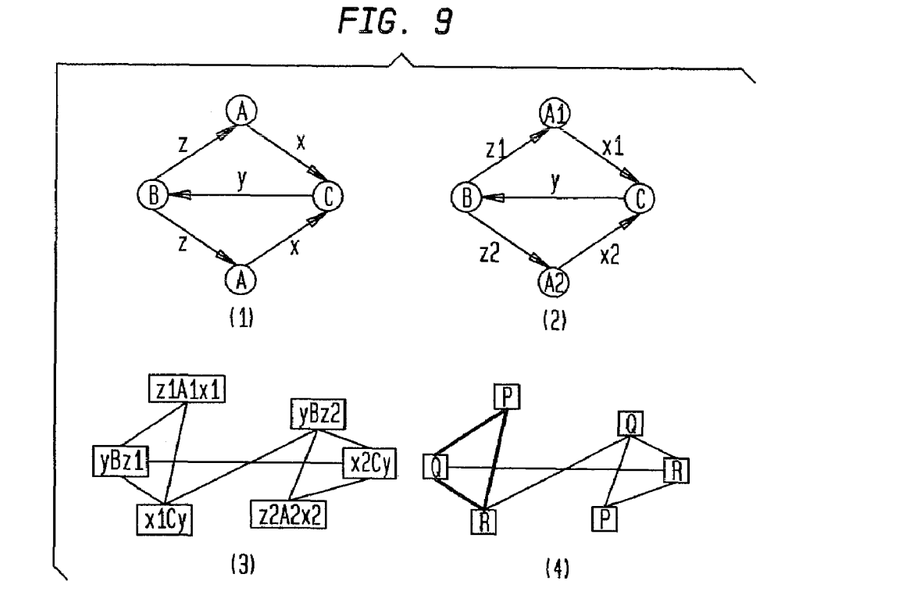
FIG. 9 is a graph that may be analyzed using the present invention.
Figure 10:
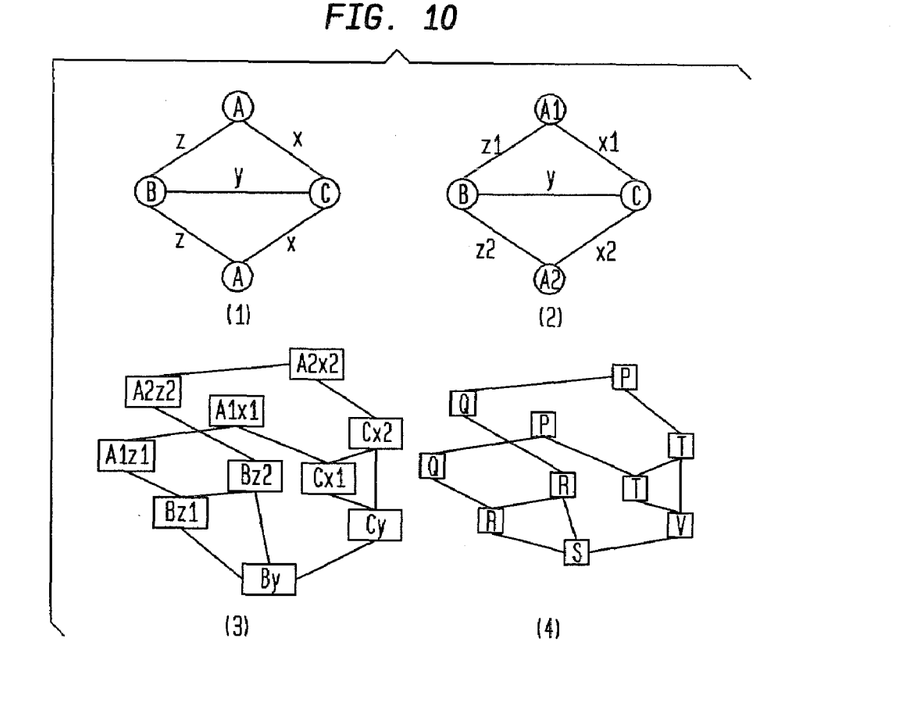
FIG. 10 shows another graph that may be analyzed using this invention.

With reference to FIG. 9 given a General graph G, we compute an undirected graph G' that has only vertex attributes by the following steps.
1. Introduce suffixes to vertices and edges with identical attributes.
2. (a) (directed graph) For each incoming edge with attribute xi, vertex with attribute $A_j$ and outgoing edge with attribute $y_k$, create a node with attribute $x_i A_j y_k$ in G'.
   (b) (undirected graph) For each incident edge with attribute $y_k$, vertex with attribute $A_j$ create a noted with attribute $A_j y_k$ in G'.
3. In G' for each pair of nodes with attributes
   (a) (directed graph)—$y_k$ and $y_k$-,
   (b) (undirected graph)—$y_k$ and $-y_k$,
   introduce an edge between these nodes.

What is claimed is:

1. A computer implemented method of identifying a motif in a graph representing a set of RNA or DNA data, said graph being a data structure stored on a computer-readable medium and having multiple vertices, the vertices having one or more attributes, the method comprising the steps of:
   for each vertex on the graph that has at least a defined one attribute, identifying a set of vertices, if any, adjacent to said each vertex and having at least one specified attribute;
   forming a first list comprised of said identified sets of vertices;
   determining unique intersections of the sets of said first list;
   saving said unique intersections in a database stored on a computer-readable medium;
   computing compact forms of the sets on said first list using a compact set notation in order to generate a compact location list; and
   identifying a motif of the graph to provide information about the set of RNA or DNA data, said motif being identified from said unique intersections and said compact location list utilizing one of compact-conglomerate notation and simultaneous breadth first search (BFS) algorithms, and said motif being stored in said database on a computer-readable medium;
   wherein said steps of computing compact forms and identifying a motif minimize combinatorial expressions associated with the set of vertices for each vertex.

2. A computer implemented method according to claim 1, wherein the step of identifying a motif includes the step of identifying a maximal motif of the graph from said unique intersections.

3. A computer implemented method according to claim 2, wherein said maximal motif is both maximal in position and maximal in size.

4. A computer implemented method according to claim 1, wherein said first list is comprised of all of said identified sets of vertices.

5. A computer implemented method according to claim 1, wherein said graph is a directed graph, and comprising the further step of mapping said directed graph to an undirected graph.

6. A computer implemented method according to claim 5, wherein in said undirected graph, only the vertices have attributes.

7. A computer implemented method according to claim 1, wherein said step of identifying a set of vertices, if any, adjacent said each vertex and having said at least one specified attribute includes the step of identifying a complete set of the vertices adjacent said each vertex and having said at least one specified attribute.

8. A computer implemented method according to claim 7, wherein the step of identifying said complete set of vertices includes the steps of:
   identifying all of the vertices of said graph that have said at least one specified attribute; and
   identifying all of the vertices of said graph that are adjacent said each vertex and that have said at least one specified attribute.

9. A computer implemented method according to claim 1, wherein the determining step includes the step of determining all of the unique intersections of the sets on said first list.

10. A computer implemented system for identifying a motif in a graph representing a set of RNA or DNA data, said graph being a data structure stored on a computer-readable medium and having multiple vertices, the vertices having one or more attributes, the computer system comprising:
  means for identifying, for each vertex on the graph that has at least a given one attribute, a set of vertices, if any, adjacent to said each vertex and having at least one specified attribute;
  means for forming a first list comprised of said identified sets of vertices;
  means for determining unique intersections of the sets of said first list;
  means for saving said unique intersections in a database stored on a computer-readable medium;
  means for computing compact forms of the sets on said first list using a compact set notation in order to generate a compact location list; and
  means for identifying a motif of the graph to provide information about the set of RNA or DNA data, said motif being identified from said unique intersections and said compact location list utilizing one of compact-conglomerate notation and simultaneous breadth first search (BFS) algorithms, and said motif being stored in said database on a computer-readable medium;
  wherein said steps of computing compact forms and identifying a motif minimize combinatorial expressions associated with the set of vertices for each vertex.

11. A computer implemented system according to claim 10, wherein the means for determining includes means for determining all the unique intersections of the sets on said first list.

12. A computer implemented system according to claim 10, wherein the means for determining includes means for employing a recursive routine to determine said unique intersections.

13. A computer implemented system according to claim 10, wherein the means for computing compact forms of the sets on said first list includes means for using said unique intersections to compute said compact forms.

14. A computer implemented system according to claim 10, wherein the means for identifying a motif includes means for describing at least some of said vertices in a notion in which neighbors of a vertex with identical attributes are treated as indistinguishable.

15. A computer implemented system according to claim 10, wherein the means for identifying a motif includes means for employing a recursive routine that breadth first traverses all the locations simultaneously to obtain the maximal topological motif.

16. A computer implemented system according to claim 15, wherein said routine is a simultaneous BFS routine.

17. A program storage device readable by machine, tangibly embodying a program of instructions executable by the machine to perform computer implemented method steps for identifying a motif in a graph representing a set of RNA or DNA data, said graph being a data structure stored on a computer-readable medium and having multiple vertices, the vertices having one or more attributes, said method steps comprising:
  for each vertex on the graph that has at least a defined one attribute, identifying a set of vertices, if any, adjacent to said each vertex and having at least one specified attribute;
  forming a first list comprised of said identified sets;
  determining unique intersections of the sets of said first list;
  saving said unique intersections in a database stored on a computer-readable medium;
  computing compact forms of the sets on said first list using a compact set notation in order to generate a compact location list; and
  identifying a motif of the graph to provide information about the set of RNA or DNA data, said motif being identified from said unique intersections and said compact location list utilizing one of compact-conglomerate notation and simultaneous breadth first search (BFS) algorithms and said motif being stored in said database on a computer-readable medium;
  wherein said steps of computing compact forms and identifying a motif minimize combinatorial expressions associated with the set of vertices for each vertex.

18. A program storage device according to claim 17, wherein the step of
  identifying said set of vertices includes the steps of:
  identifying all of the vertices of said graph that have said at least one specified attribute; and identifying all of the vertices of said graph that are adjacent said each vertex and that have said at least one specified attribute.

19. A program storage device according to claim 17, wherein said graph is a directed graph, the method steps comprise the further step of mapping said directed graph to an undirected graph, and wherein in said undirected graph, only the vertices have attributes.

20. A program storage device according to claim 17, wherein the step of identifying a motif includes the step of identifying a maximal motif of the graph from said unique intersections, said maximal motif is both maximal in position and maximal in size.

21. A program storage device according to claim 17, wherein said first list is comprised of all of said identified sets of vertices, and the determining step includes the step of determining all of the unique intersections of the sets on said first list.

22. A computer implemented method of identifying a maximal topological motif in a graph representing a set of RNA or DNA data, said graph having multiple vertices, each of the vertices having at least one of a group of defined attributes, the method comprising the steps of:
  for each vertex on the graph that has at least a defined one attribute, identifying a set of vertices, if any, adjacent to said each vertex and having at least one specified attribute;
  forming a first list comprised of all of said identified sets of vertices;
  determining all of unique intersections of the sets of said first list;
  saving said unique intersections in a database stored on a computer-readable medium;
  computing compact forms of the sets on said first list using a compact set notation in order to generate a compact location list; and
  identifying a maximal topological motif of the graph to provide information about the set of RNA or DNA data, said motif being identified from said unique intersections and said compact location list utilizing one of compact-conglomerate notation and simultaneous breadth first search (BFS) algorithms and said motif being stored in said database on a computer-readable medium;
  wherein said steps of computing compact forms and identifying a motif minimize combinatorial expressions associated with the set of vertices for each vertex.

23. A computer implemented method according to claim 22, wherein said maximal topological motif is maximal in both position and size.

24. A computer implemented method according to claim 22, wherein said step of identifying a set of vertices, if any adjacent said each vertex and having said at least one specified attribute includes the step of identifying a complete set of the vertices adjacent said each vertex and having said at least one specified attribute.

25. A computer implemented method according to claim 22, wherein said graph is an undirected graph, and comprising the further step of obtaining said graph from a directed graph by mapping said directed graph to said undirected graph.

26. A computer implemented method according to claim 22, wherein said first list is comprised of all of said identified sets of vertices and only said identified sets of vertices.

* * * * *